P. H. KECK.
SHAFT BEARING.
APPLICATION FILED DEC. 18, 1918.
1,320,065.
Patented Oct. 28, 1919.
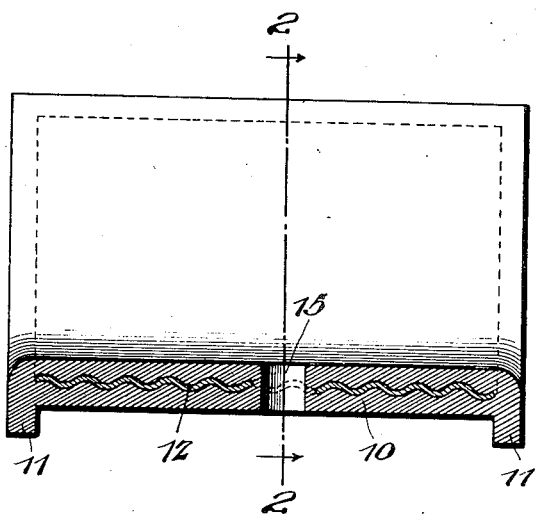
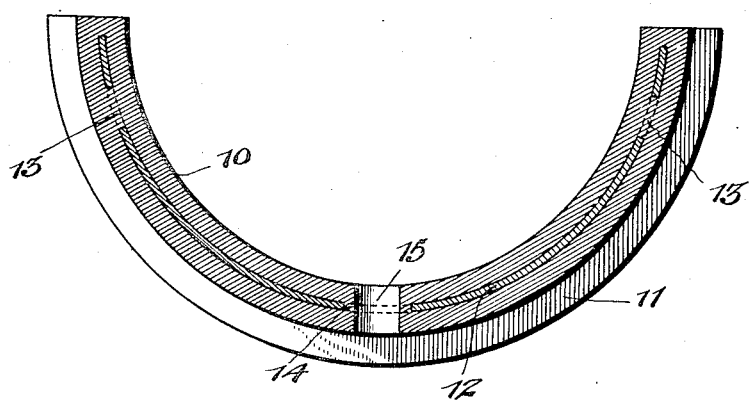
WITNESS
INVENTOR
P. H. Keck
BY
ATTORNEYS

UNITED STATES PATENT OFFICE.

PAUL HERMAN KECK, OF CHICAGO, ILLINOIS.

SHAFT-BEARING.

1,320,065.  Specification of Letters Patent.  Patented Oct. 28, 1919.

Application filed December 18, 1918. Serial No. 267,273.

*To all whom it may concern:*

Be it known that I, PAUL HERMAN KECK, a citizen of the United States, and a resident of Chicago, county of Cook, and State of Illinois, have invented certain new and useful Improvements in Shaft-Bearings, of which the following is a specification.

My present invention relates generally to bearings and particularly to shaft bearings and the like, my object being to strengthen the same as well as increase the life and length of service thereof by the insertion of a stabilizing and stiffening agent within the notoriously soft unstable material of which bearings of the present nature are made.

My invention is more particularly applied in the form of an insert embedded within the babbitt or other metal bearing and is such as to greatly increase the stability and effective life of the bearing.

In the accompanying drawing illustrating my present invention;

Figure 1 is a longitudinal section through a half-bearing provided with my improvements;

Fig. 2 is a transverse section therethrough taken substantially on line 2—2 of Fig. 1.

Referring now to these figures, I have illustrated a half-bearing of semi-cylindrical shape 10 usually manufactured of babbitt or other comparatively soft unstable material, the body appearing at 10 and having end flanges 11 which engage opposite sides of the bearing clamp in practice.

In a bearing of this nature my invention proposes a thin metal insert 12 curved to conform to the curvature of the semi-cylindrical bearing and in area slightly less than the complete area of the body 10, this insert being formed of a material which in its nature, is relatively stiff as compared to that of the bearing itself, and preferably corrugated in addition thereto, the corrugations running lengthwise of its curvature.

This structure renders the entire bearing more stable and capable of greater resisting powers under strain, and the stabilizing element being in the form of an insert entirely embedded within the bearing, the latter is obviously free to perform its ordinary functions in the ordinary way apart from the invention.

The insert may for instance be perforated as indicated at 13 in Fig. 3 for the purpose of permitting the material of the bearing to flow through said perforations and more homogeneously unite the insert within the body of the bearing, and the insert may also be apertured as for instance seen at 14 in Fig. 2 and to coincide with an aperture 15 through the bearing itself, for oiling or other purposes.

I claim:

1. A bearing for shafts and the like having a stiffened metal plate embedded therein.

2. The combination with a bearing, of an insert consisting of a semi-cylindrical section of corrugated sheet-metal embedded in the bearing for the purpose described.

3. A bearing for shafts and the like having a corrugated metal plate embedded therein.

4. A bearing for shafts and the like having a thin comparatively stiff metal insert, curved to conform to the curvature of the bearing and embedded therein, said insert being corrugated and having its corrugations extending lengthwise in the direction of its curvature.

5. The combination with a bearing, of an insert wholly embedded therein and consisting of a semi-cylindrical section of corrugated sheet-metal having its corrugations extending in the direction of its curvature.

PAUL HERMAN KECK.